United States Patent [19]

York

[11] Patent Number: 4,806,063
[45] Date of Patent: Feb. 21, 1989

[54] PORTABLE WILD GAME HOIST

[76] Inventor: W. Clifton York, Rte. 6, Box 35, Quincy, Fla. 32351

[21] Appl. No.: 167,278

[22] Filed: Mar. 11, 1988

[51] Int. Cl.$^4$ .............................. A22B 5/06; B60R 9/06
[52] U.S. Cl. ...................................... 414/462; 17/44.2; 224/42.03 R; 212/180
[58] Field of Search ........................ 414/462, 540, 542; 212/179, 180; 17/21, 44.2; 224/42.03 R, 42.03 B

[56] References Cited

U.S. PATENT DOCUMENTS

| | | | |
|---|---|---|---|
| 2,661,854 | 12/1953 | Adams | 212/180 X |
| 2,867,402 | 1/1959 | Graybill et al. | 224/42.03 R X |
| 3,139,203 | 6/1964 | Borger | 414/462 |
| 3,797,672 | 3/1974 | Vermette . | |
| 3,804,263 | 4/1974 | Castonguay | 414/462 X |
| 3,854,168 | 12/1974 | Bradley | 17/44.2 |
| 3,888,368 | 6/1975 | Hawkins . | |
| 4,191,316 | 3/1980 | Baumgartner | 414/462 X |
| 4,216,941 | 8/1980 | Little | 414/563 |
| 4,348,151 | 9/1982 | Olson | 414/542 |
| 4,397,607 | 8/1983 | Neill et al. | 414/462 X |
| 4,419,038 | 12/1983 | Pendergraft | 414/543 |
| 4,463,858 | 8/1984 | Bilas | 212/176 |
| 4,508,233 | 4/1985 | Helms | 212/182 |
| 4,576,395 | 3/1986 | Longoria | 224/42.03 R X |
| 4,630,990 | 12/1986 | Whiting | 414/462 |
| 4,671,731 | 6/1987 | Harlan | 414/550 |

FOREIGN PATENT DOCUMENTS

| | | | |
|---|---|---|---|
| 148029 | 12/1954 | Sweden | 414/540 |
| 1126471 | 11/1984 | U.S.S.R. | 414/542 |

*Primary Examiner*—Leslie J. Paperner
*Attorney, Agent, or Firm*—John E. Benoit

[57] ABSTRACT

A portable wild game hoist having a multiple section boom which can be assembled and dismantled. The boom is supported at its lower end by a standard trailer hitch mounted on the rear of a vehicle. Straps are secured to the upper section of the boom and terminate in hooks at their distal ends which are adapted to mate with the edges of the fenders of the vehicle. A torsion bar is adjustably secured to one section of the boom so that is bears against the rear body or tailgate of the vehicle. A rope extends from a winch secured to the boom through a pulley at the distal end of the boom. The rope supports a hanger with hooks for supporting the animal from its rear hooves. In a further embodiment, the boom may be supported by a base resting on the ground and stabilized by the trailer hitch. In both embodiments, the boom is comprised of a plurality of mating sections.

11 Claims, 2 Drawing Sheets

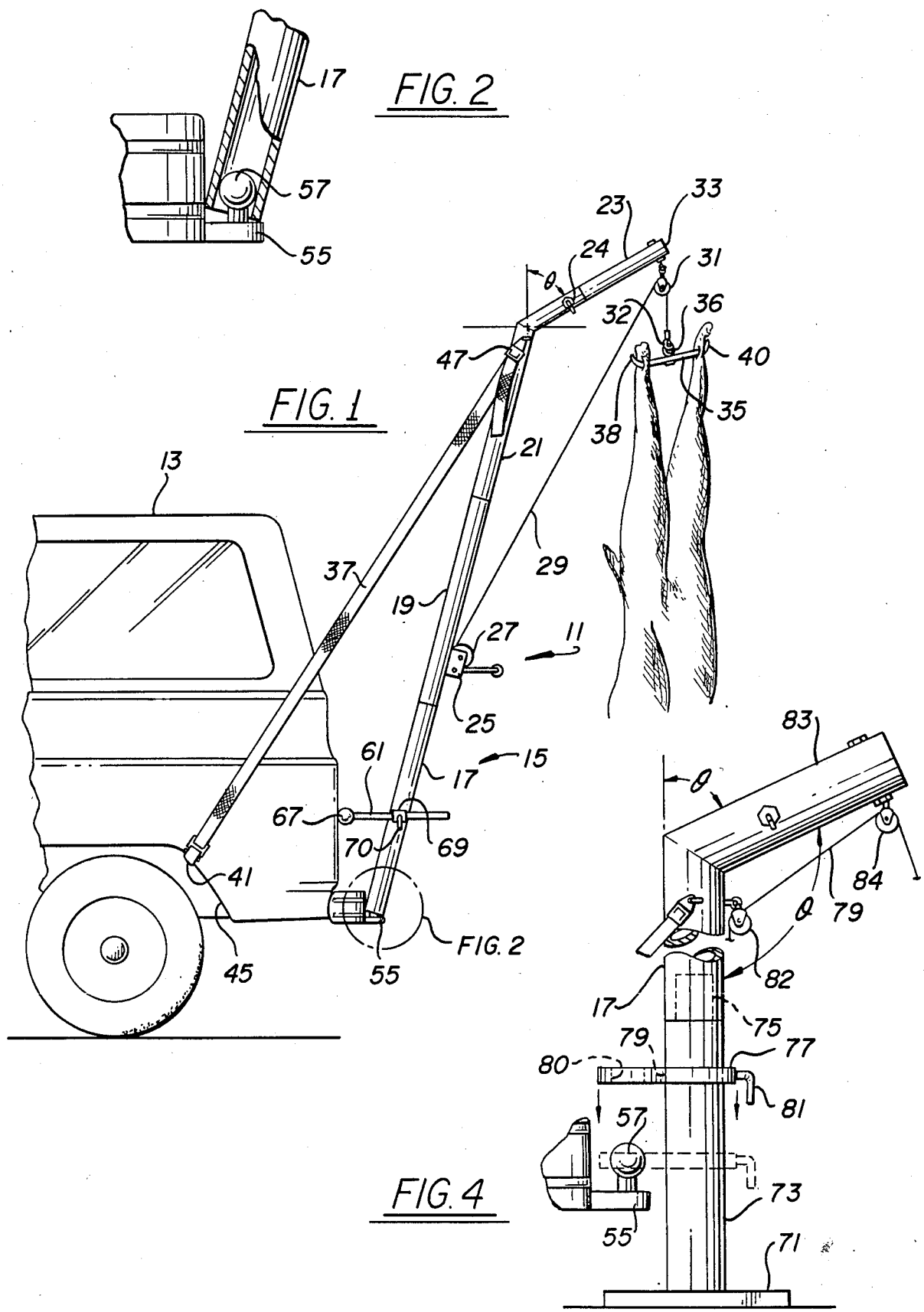

PORTABLE WILD GAME HOIST

This invention relates generally to hoists and, more particularly, to a portable wild game hoist.

One of the most common problems associated with wild game hunting, particularly deer, elk, and the like, is the necessity to pack the animal onto a truck or fender of a car or the like after it has been killed and carry it to a place where it may then be hoisted on a permanent type of hoist so that it may be skinned and dressed.

If there were a convenient and economical means for hoisting the animal at the site of the kill so that it could be skinned and dressed, many of the unpleasant problems associated with hunting could be eliminated.

While it is known to use hoists in the field in connection with trucks and even pickups, such hoists are designed for substantially heavy loads. As a consequence, they are secured to the trucks or pickups in at least a semi-permanent fashion and are dependent upon the distribution of the weight load over the basic support structure of the vehicle in order to avoid imbalance while hoisting the particular load. Due to size and cost, such systems are just not practical for the average hunter relative to hoisting and skinning animals at the site of the kill.

Accordingly, it is an object of this invention to provide a portable hoist which may be used in conjunction with a standard trailer hitch of a vehicle for hoisting and supporting wild animals.

A further object of this invention is to provide a portable hoist for wild animals which may be used in connection with the trailer hitch of a vehicle and which may be dismantled and stored in a relatively small area.

These and other objects of the invention will become apparent from the following description, taken together with the drawings.

SUMMARY OF THE INVENTION

The invention provides a wild game hoist for removable attachment to a vehicle comprising a sectional boom with an angular section at its upper end with means on the lower end of the boom for adapting the boom in a mating relationship with a trailer hitch attached to a vehicle. At least two straps are removably secured to the upper section of the boom and have hooks at their distal ends, with the hooks being adapted so as to be hooked to the fenders of a vehicle. A winch is secured to the boom with a pulley being secured to the distal end of the boom and a rope extends from the winch and through the pulley. A hanger is secured to the end of the rope so as to support an animal, normally by its hind legs. A torsion bar, when required, is secured to the boom and is adapted to bear against the body of the vehicle to complete the structural support for the animal.

BRIEF DESCRIPTION OF THE DRAWINGS

FIG. 1 is a side elevational view of one embodiment of the present invention mounted in place at the rear of a vehicle;

FIG. 2 is a partial sectional view taken through the indicated area of FIG. 1;

FIG. 4 is an elevational view of a modification of the apparatus of FIG. 1.

DETAILED DESCRIPTION OF THE INVENTION

Figure 3:
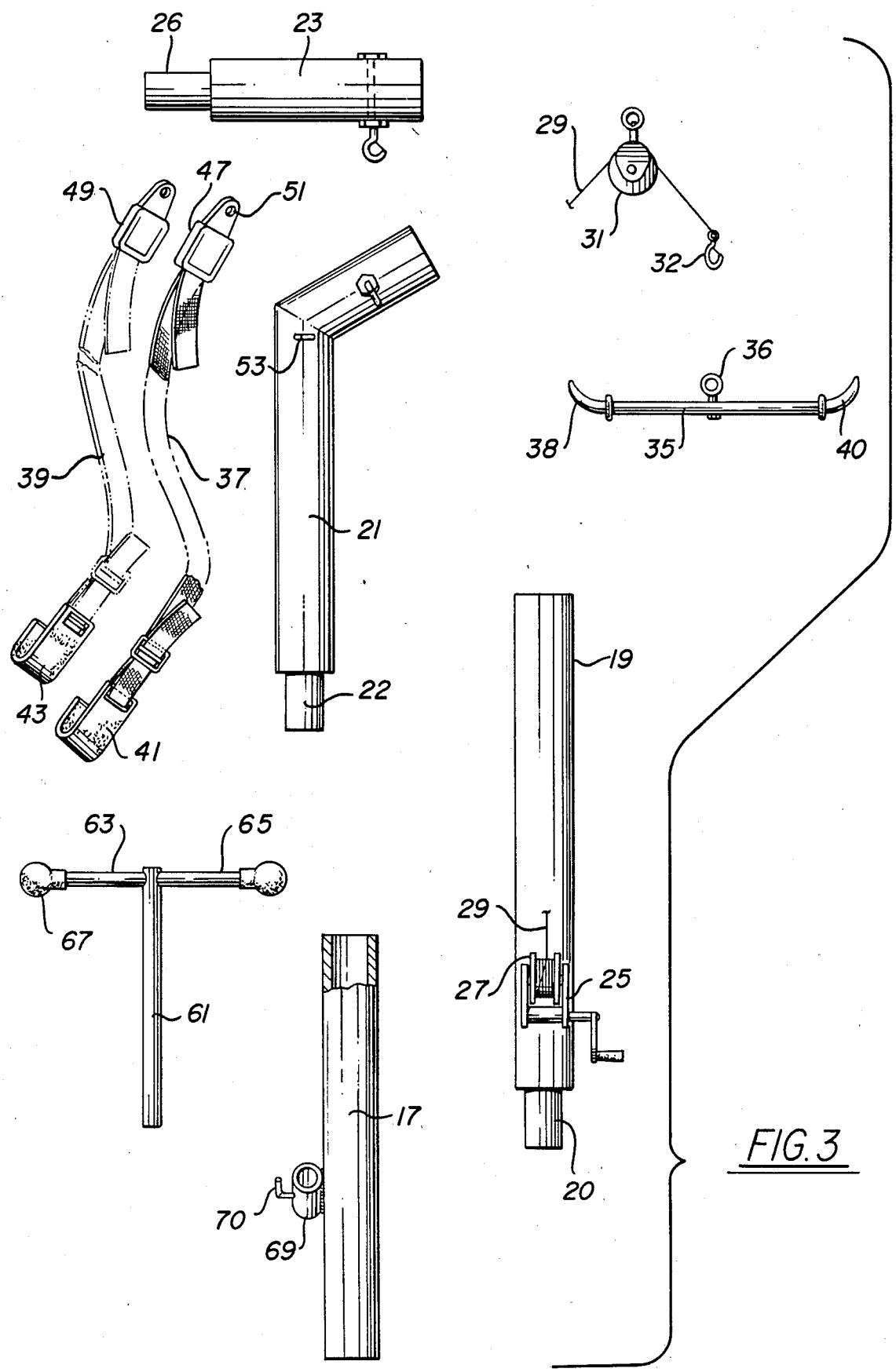
FIG. 3 is a view of the parts of the present invention in dismantled form.

In the following description, reference is first made to the mounted hoist of FIGS. 1-2 and the dismantled parts of the invention as shown in FIG. 3.

In FIG. 1 there is shown hoist 11 which is secured to vehicle 13. The main support member of hoist 11 is boom 15, comprised of mating but separable sections 17, 19, 21, and 23. As shown in FIG. 3, these sections are primarily constructed of tubular rigid material such as steel or aluminum and each of the sections 19, 21, and 23 terminate in reduced diameter extensions 20, 22, and 26, respectively. The reduced sections mate with and fit within the adjacent tubular sections. Because of the position of the boom as shown in FIG. 1, only section 23 requires locknut 24 to assure that it is held within section 21.

Winch 25, including reel 27, is secured to section 19 by any means such as welding, bolting, or the like. Rope 29 extends from winch 25 and passes upward over pulley 31, which is secured to the distal end 33 of section 23. Rope 29 terminates in hook 30. Hanger 35, of the type commonly used to hoist animals for skinning and dressing, includes hooks 38 and 40 at the ends thereof and is mated to hook 32 by means of eyelet 30.

Belts 37 and 39, preferably of the mesh type such as are used with standard automobile seat belts, are removably attached to hooks 53 on either side of section 21 by means of holes 51 in the plates associated with standard adjustable buckles 47 and 49 of the seat belt type. Belts 37 and 39 terminate at the other ends in hooks 41 and 43, which are preferably rubber covered. These hooks are adapted so as to hook around and grasp the fenders 45 of the vehicle with which the hoist is being used. As will be obvious from the showing in FIG. 3, the belts are adjustable from either end, as in the case of standard automobile seat belts.

Trailer hitch 55 is secured to the vehicle and extends outwardly therefrom and includes ball 57 as in the normal ball-type trailer hitch. Cylindrical section 17 fits over ball 57 and rests on hitch 55 to provide the basic support for the hoist. In order to complete this type of hoist, torsion bar 61, having transverse arms 63 and 6,, extends through sleeve 69, which is provided so that torsion bar 61 may be adjustable so as to place the padded ends of arms 63 and 65 against the body or tailgate of the vehicle.

When the hunter is in the field and has killed the animal which he has been hunting, he then assembles the parts of the hoist depicted in FIG. 3 so as to place section 17 over the bumper, with the other sections attached as shown. Straps 37 and 39 are then secured to boom 11 and to the fenders of the vehicle. Torsion bar 61 is also adjusted prior to using the hoist. Winch 25 is operated so as to lower hanger 35 to the ground. Ends 38 and 40 of the hanger are then inserted through the ankle portions of the animal below the rear hooves and the winch is operated so as to hoist the animal in the position basically shown by the dotted line above the ground for purposes of skinning and dressing. As will be obvious once this is accomplished, the animal can be lowered and detached from the hanger and the entire hoist may be dismantled and stored.

The angle $\phi$ of section 21 is preferably between 45° and 70°, with the preferred angle for the embodiment illustrated in FIGS. 1-3 being substantially 45°.

An auxiliary piece of equipment may also be used in a further embodiment of the present invention. This auxiliary equipment is shown in FIG. 4 and consists of a base 71 which rests upon the ground and an upstanding support member 73 terminating in a reduced section 75. Section 75 is adapted to fit within section 17 of boom 11. In this modification, plate 77 includes borehole 79, which fits about the circumference of support 73 and is slidable up and down the support. It also includes a borehole 81 passing therethrough which mates with ball 57 of trailer hitch 55 when plate 17 is lowered to the dotted line position as shown. Locknut 83 is provided to secure it in its desired position. In this configuration, the main support is provided by base 71 and support member 73, while the trailer hitch stabilizes the support and maintains it in its proper position. When the equipment of FIG. 4 is used, there is no need for a torsion bar since the main portion extends substantially vertically above base 71. In order to avoid interference between cable 79 and the animal, the angle $\phi$ is increased to substantially 70° and pulley 81 is added to cooperate with pulley 83. Obviously, the length of section 23, FIG. 1, or 83, FIG. 4, could be increased and the angle $\phi$ reduced while providing the necessary clearance.

The above description and drawings are illustrative, only, since the various parts could be modified without departing from the invention, the scope of which is to be limited only by the following claims.

I claim:

1. A wild game hoist for removable attachment to a vehicle comprising
   a boom having an angular section at its upper end;
   a cylindrical section at the lower end of said boom for adapting said boom to a mating relationship with the ball of a trailer hitch attached to a vehicle;
   at least two straps secured to the upper section of said boom;
   a hook secured to the distal end of each strap adapted to be hooked to the fenders of a vehicle;
   a winch secured to said boom;
   at least one pulley secured to the distal end of said boom;
   a rope extending from said winch and through said pulley;
   hanger means secured to the end of said rope adapted to support an animal by its legs; and
   a torsion bar secured to said boom and adapted to bear against the body of a vehicle.

2. The hoist of claim 1 wherein said boom comprises a plurality of separable mating sections.

3. The hoist of claim 1 wherein said strap are removably secured to said boom.

4. The hoist of claim 1 wherein said torsion bar is adjustable relative to said boom.

5. The hoist of claim 1 wherein said torsion bar is removably secured to said boom.

6. The hoist of claim 1 wherein the lower end of said boom rests on and is supported by the trailer hitch.

7. The hoist of claim 1 wherein said angular section extends at an angle between 45° and 70° to the vertical.

8. The hoist of claim 1 wherein said angular section extends at an angle of substantially 45° to the vertical.

9. A wild game hoist for removable attachment to a vehicle comprising
   a boom having an angular section at its upper end;
   means on the lower end of said boom for adapting said boom to a mating relationship with a trailer hitch attached to a vehicle;
   at least two straps secured to the upper section of said boom;
   a hook secured to the distal end of each strap adapted to be hooked to the fenders of a vehicle;
   a winch secured to said boom;
   at least one pulley secured to the distal end of said boom;
   a rope extending from said winch and through said pulley;
   hanger means secured to the end of said rope adapted to support an animal by its legs;
   a base adapted to be placed on the ground;
   means extending from said base and adapted to be secured to the lower end of said boom so that said boom is supported by said base; and
   plate means slidably adjustable along aid means extending from said base and having a borehole therethrough adapted to pass over the ball of a trailer hitch so as to stabilize said boom.

10. The hoist of claim 9 further comprising a second pulley secured to said boom for receiving said rope.

11. The hoist of claim 10 wherein said angular section of said boom extends at an angle of substantially 70°.

* * * * *